Patented Dec. 31, 1940

2,227,223

UNITED STATES PATENT OFFICE 2,227,223

PROCESS OF MAKING UREA-FORMALDEHYDE RESIN

Theodore S. Hodgins, Royal Oak, and Almon G. Hovey, Birmingham, Mich., assignors to Reichhold Chemicals, Inc., Detroit, Mich.

No Drawing. Application July 26, 1939, Serial No. 286,729

2 Claims. (Cl. 260—70)

The invention relates to the preparation of resinous condensation products of the urea-formaldehyde type, suitable for use in the preparation of coating compositions.

The present application is a continuation-in-part of our application Serial No. 203,149 filed April 20, 1938, now Patent No. 2,221,708 dated November 12, 1940, and of our application Serial No. 268,782 filed April 19, 1939, now Patent No. 2,222,506 dated November 19, 1940.

We are aware of the fact that many urea-formaldehyde resin patent disclosures have been made, but most of these cover intended molding compositions, and only a relatively few describe attempts at making a good coating composition. One of the earliest attempts at making a coating composition is set forth in Lauter U. S. Patent No. 1,633,337 dated June 21, 1927. However, Lauter's examples usually contain glycerine in order to make a coating composition, but the weakness of this resides in the fact that the water-resistance is poor and the solubility is limited to water, acetone, and lower alcohols which are also water-soluble and water-miscible. In our improvement, we confine ourselves to the urea-formaldehyde resins which have extremely high tolerances not only for aromatic hydrocarbons, but also for the straight chain aliphatic type, and which are capable of blending with alkyd resins of a class described later in the specification.

Many investigators have described urea-formaldehyde condensation products, but their processes are strictly anhydrous. Among these are:

Saunders, British Patent No. 442,054.
Johnson, British Patent No. 344,626.
Pungs, U. S. Patent No. 1,836,553.
Eisenmann and Kuchenbuch, British Patent 261,029.
Pungs et al., U. S. Patent No. 1,967,685.

These disclosures involve the use of formaldehyde in some anhydrous form such as paraformaldehyde, trioxymethylene, or methylol-ureas. The use of paraformaldehyde and of trioxymethylene is almost prohibitive for industrial use on account of the high cost, and the use of mono- or dimethylolurea is also relatively expensive as compared to the use of aqueous formaldehyde because it involves a two-step process and double handling.

Rothrock, in U. S. Patent No. 2,124,151, has described an anhydrous process, using aldehydes of a carbon atom length of 2 or more, but does not use formaldehyde. We prefer to use ordinary aqueous formaldehyde, not only on account of the necessity of economy in making a product for a highly competitive field, but also because of the fact that we are able to obtain harder products and better color and color retention.

We also prefer to use alcohols of a carbon atom length of 4. Less than 4 does not produce the hydrocarbon-solubility and alkyd resin-miscibility that is desirable from a commercial standpoint. An alcohol of more than 4 carbon atom length tends to introduce too great a plasticizing action and cuts down the hardening effect of the urea-formaldehyde-monohydric alcohol condensation products upon alkyd resins. Eisenmann, for example, in U. S. Patent No. 2,108,113, uses fatty alcohol of an 8 carbon atom length or greater, thus varying considerably the properties, so that while his hydrocarbon-solvency and miscibility are improved greatly, nevertheless, the hardening effect has been largely nullified. We are also aware of the fact that Ripper, in U. S. Reissue Patent No. 19,463; Ramstedter, in German Patent No. 403,645 (1922), and Crump, in British Patent No. 309,849 (1928) have described the introduction of organic solvents into the reaction mixture for the purpose of dehydrating the resinous condensation product. None of these three, however, discloses water-white, heat-hardening resinous products which are, at the same time, soluble in aromatic hydrocarbons, tolerate a minimum of 200% of straight chain petroleum spirits, (aliphatic hydrocarbons), and are miscible with alkyd resins to form homogeneous solutions and homogeneous light-colored baking vehicles suitable for making high class coatings such as refrigerator finishes, mar-resistant finishes, and the like.

Our one-stage process should not be confused with the two-stage process of Hill and Walker, British Patent No. 491,857, in which urea is first reacted with butyl alcohol to form normal butyl carbamate by distilling out ammonia and then using this butyl carbamate as a modifier for urea and formaldehyde condensation; in our process no ammonia is evolved, with consequently higher yields. Neither is our process to be confused with that of Saunders in British Patent No. 484,200. Saunders has to use some paraformaldehyde in every example except No. 5, but even in this example he admits he is not able to obtain mineral spirits-solubility to any extent. The products which we describe not only use aqueous formaldehyde in a very inexpensive and efficient process, but also, the resulting products are water-white, heat-hardening resin solutions which, at 60% non-volatile content in butanol, possess miscibility to at least a minimum of 200% in mineral spirits (a straight chain petroleum solvent boiling between 300° F. and 400° F.), and which have complete miscibility with commercial alkyd resins, and are capable of forming with certain types of alkyd resins beautiful white refrigerator type enamels which possess excellent color and color retention.

We have found that the successful formulation of a urea-formaldehyde-butanol resinous condensation product, which is suitable for combination with alkyd resins to form high quality enamels of the type just mentioned, depends upon a great deal of careful manipulation throughout the entire process. While many steps which have been described in the past are necessary, nevertheless, careful control throughout every step of the process must be exercised, that is, providing that inexpensive aqueous formaldehyde is to be used.

Briefly, our invention comprises a process for preparing a resinous reaction product which consists of reacting aqueous formaldehyde with urea in the presence of butyl alcohol in the ratio of at least 3 mols of formaldehyde to 1 mol of urea and approximately 200 parts by weight of butyl alcohol per mol of urea, an alkaline catalyst such as KOH being initially present in the reaction mixture and the pH of said reaction mixture being approximately 8-9, after which the temperature is raised to 100° C. in approximately ½ hour, and after holding the temperature at about 100° C. for a period of approximately 1 hour the mass is acidified with phosphoric acid to a pH of 5-6, this particular acid behaving as a buffer and as a pH control due to its interaction with the butyl alcohol, and forming a mono ester during the condensation, with subsequent distillation of the azeotropic mixture of butanol and water until the etherification reaction is completed as measured by the nitrogen content (approximately 18%), the resulting product being substantially free of water and at this degree of etherification being soluble in alcohols, ketones, aromatic hydrocarbons, and at a 60% solution in butanol, a minimum dilution of 200% in straight chain aliphatic hydrocarbons. Furthermore, this resulting product is characterized by its compatibility with certain types of alkyd resins, and yields clear, transparent, rapid hardening homogeneous films. This is a relatively simple one-stage process in spite of the fact that very specific and careful control must be exercised throughout the process, and the results are very easily reproducible, so that the uniformity of the material is very great from batch to batch. It is necessary to employ an excess of 1 mol of formaldehyde in excess of the theoretical amount over the theoretical 1 mol of urea to 2 mols of formaldehyde; this has been found necessary from the standpoint of stability of the product in package for one year or more. This necessary excess of formaldehyde is characteristic of resins made by this process.

It will thus be seen that our invention is a sequence of many small but interrelated steps in well timed succession. These steps include:
1. The order of adding the reacting ingredients.
2. The addition of catalysts.
3. The formation of an intermediate condensation product under reflux in the presence of butanol.
4. The advancement of resin under a catalyst which also acts as a buffer.
5. Dehydration simultaneously with advancement of resin under controlled conditions.

Our invention will be more readily seen from the following example:

Example 2430 parts by weight (30 mols) of 37% aqueous formaldehyde are loaded into a reaction vessel. A sufficient amount of an alkaline catalyst such as KOH to bring the pH of the formaldehyde to 8-9 is added, then 600 parts by weight (10 mols) of urea are added, and then 2000 parts by weight of butanol are added. This reaction mixture is heated to 100° C. in approximately ½ hour and refluxed under cooling water for 1 hour, at the end of which time the reaction mixture is acidified with phosphoric acid to a pH of 5-6, preferably 5.5, which not only acts as a pH control, but behaves also as a buffer due to its interaction with the butyl alcohol with which it forms the mono-ester. Subsequently, after the acidification, the azeotropic mixture of butanol and water is distilled out of the reaction mixture over a period of approximately 8 hours, during which period advancement of the resin takes place simultaneously until the resulting resinous product has a nitrogen content of 17.5-18.5 which represents an etherification of approximately ½ mol of butanol on the basis of 1 mol of urea. The resulting product is substantially free of water at this degree of etherification, and is soluble in alcohols, ketones, aromatic hydrocarbons, and, as a 60% solution in butanol, will tolerate a minimum of 200% of straight chain aliphatic hydrocarbons solvent. Furthermore, this product is characterized by its compatibility with oil modified alkyd resins which, in general, consist of 27-63% of oil glyceride and 73-37% glycerol phthalate, and which are, in general, supplied in solution at a concentration of 45-80% in aromatic hydrocarbons or at a concentration of 50-80% in mineral spirits, depending on the solubility of the alkyd, the shorter oil alkyds being generally in aromatic hydrocarbons, and the longer alkyds being usually in mineral spirits. When alkyds are used which are in mineral spirits solution, the necessity for high mineral spirits tolerance of the urea-formaldehyde-butanol resin may be seen. Such a urea-formaldehyde resin is extremely valuable when used in combination with short non-drying or semi-drying alkyd resins such as those made from cocoanut oil fatty acids, soya bean oil fatty acids and/or their respective oils. Alkyd resins which consist of 30-50% soya glyceride and those which consist of 27-35% of the glyceride of cocoanut oil or lauric acid are particularly useful in combination with this urea-formaldehye resin for the formulation of white, hard, glossy refrigerator enamel vehicles which possess not only light color, but also color retention. When concentrations of 40-50% of this urea-formaldehyde resin with such alkyd resins on a non-volatile basis are used, the resistance to discoloration, water, humidity, grease, mild acids and alkalis, and abrasion is especially good. This combination of desirable properties for metal finishing, such as refrigerators, has never been equalled heretofore.

Furthermore, exposure studies made at 45° facing south in Florida show that, in general, enamels formulated with the addition of this urea-formaldehyde resin to alkyd resin does not appear to detract from the durability of the alkyd resins, the alkyd resins being generally recognized as among the best materials ever made for resistance to weathering. Since this urea-formaldehyde resin does not detract from the durability of a good finish formulated with alkyd resin vehicles, its value in hardening automotive finishes and rendering them more marproof without sacrifice in color is readily apparent.

We claim:

1. A process for preparing a resinous condensation product which comprises reacting aqueous formaldehyde with urea in the presence of butanol, in the ratio of at least 3 mols of formaldehyde to 1 mol of urea and approximately 200 parts by weight of butanol per mol of urea, the reaction mixture having initially a pH of 8-9 and containing a small quantity of an alkaline catalyst, heating the mixture to approximately 100° C. within ½ hour, maintaining said temperature for approximately 1 hour, acidifying with phosphoric acid to a pH of 5-6, the phosphoric acid acting as a buffer as well as a pH control due to its reaction with the butanol to form a monoester, and subsequently, after acidification, distilling out the azeotropic mixture of butanol and water until the etherification, as measured by the nitrogen content, indicates that approximately ½ mol of butanol has combined with 1 mol of urea, the nitrogen content of the product being approximately 18%.

2. A process for preparing a resinous condensation product which consists of reacting aqueous formaldehyde with urea in the presence of butanol in the ratio of 3 mols of formaldehyde to 1 mol of urea and approximately 200 parts of butanol per mol of urea, an intermediate product being formed in the presence of a small amount of KOH catalyst, making the reaction mixture pH of 8-9, reaching approximately 100° C. at a period of ½ hour and then holding for 1 hour and acidifying with phosphoric acid to a pH of 5-6, the phosphoric acid behaving as a buffer as well as pH control due to its interaction with butanol, forming the mono ester, subsequently after the acidification distilling out the azeotropic mixture of butonol and water until the etherification, as measured by the nitrogen content, shows that approximately ½ mol of butanol has tied up with per 1 mol of urea the resulting resinous product being substantially free of water and at this degree of etherification is soluble not only in alcohols, ketones, and aromatic hydrocarbons, but when supplied at a 60% solution in butanol, has a minimum tolerance of 200% in straight chain aliphatic hydrocarbons, said product at a 60% solution in butanol being characterized by compatibility with alkyd resins yielding clear, transparent, rapid heat setting homogeneous light colored films, the nitrogen content of the final product being approximately 18%.

THEODORE S. HODGINS.
ALMON G. HOVEY.